United States Patent
Kim et al.

(10) Patent No.: US 9,363,502 B2
(45) Date of Patent: Jun. 7, 2016

(54) APPARATUS FOR SYNCHRONIZING STEREOCAMERA, STEREOCAMERA, AND METHOD OF SYNCHRONIZING STEREOCAMERA

(71) Applicant: SAMSUNG ELECTRO-MECHANICS CO., LTD., Suwon-si (KR)

(72) Inventors: Joo Hyun Kim, Hwaseong-si (KR); Soon Seok Kang, Yongin-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 461 days.

(21) Appl. No.: 13/659,858

(22) Filed: Oct. 24, 2012

(65) Prior Publication Data

US 2013/0100246 A1    Apr. 25, 2013

(30) Foreign Application Priority Data

Oct. 25, 2011    (KR) .................... 10-2011-0109375

(51) Int. Cl.
*H04N 13/00* (2006.01)
*H04N 13/02* (2006.01)
*H04N 13/04* (2006.01)

(52) U.S. Cl.
CPC ....... *H04N 13/0296* (2013.01); *H04N 13/0051* (2013.01); *H04N 13/0239* (2013.01); *H04N 13/0497* (2013.01)

(58) Field of Classification Search
CPC .......... H04N 13/0051; H04N 13/0296; H04N 2013/0096; H04N 13/0497
See application file for complete search history.

(56) References Cited

U.S. PATENT DOCUMENTS

| | | |
|---|---|---|
| 7,558,326 B1 * | 7/2009 | Lyle et al. .................... 375/244 |
| 2011/0267269 A1 * | 11/2011 | Tardif et al. .................. 345/158 |
| 2012/0105592 A1 * | 5/2012 | Chen ................................ 348/47 |
| 2012/0162511 A1 * | 6/2012 | Hewes et al. ................ 348/510 |
| 2013/0021438 A1 * | 1/2013 | Tucker ........................... 348/43 |

FOREIGN PATENT DOCUMENTS

| KR | 10-2008-0006902 A | 1/2008 |
|---|---|---|
| KR | 10-2010-0112840 A | 10/2010 |

* cited by examiner

*Primary Examiner* — Sath Perungavoor
*Assistant Examiner* — Xiaolan Xu
(74) *Attorney, Agent, or Firm* — NSIP Law

(57) ABSTRACT

Provided are an apparatus for synchronizing a stereocamera, a stereocamera, and a method of synchronizing a stereocamera. The apparatus for synchronizing a stereocamera includes a synchronization error calculating unit configured to calculate a synchronization error from output signals of first and second image sensors, and a pulse adjusting unit configured to adjust a pulse of a synchronization signal of at least one of the first and second image sensors using the calculated error. In addition, the stereocamera and the method of synchronizing the same are provided.

8 Claims, 8 Drawing Sheets

APPARATUS FOR SYNCHRONIZING STEREOCAMERA, STEREOCAMERA, AND METHOD OF SYNCHRONIZING STEREOCAMERA

CROSS-REFERENCE TO RELATED APPLICATIONS

This application claims the benefit of Korean Patent Application No. 10-2011-0109375 filed with the Korea Intellectual Property Office on Oct. 25, 2011, the disclosure of which is incorporated herein by reference.

BACKGROUND OF THE INVENTION

1. Field of the Invention

The present invention relates to an apparatus for synchronizing a stereocamera, a stereocamera, and a method of synchronizing a stereocamera, and more particularly, to an apparatus for synchronizing a stereocamera, a stereocamera, and a method of synchronizing a stereocamera that are capable of synchronizing image data with no frame memory.

2. Description of the Related Art

An image signal processing for a three-dimensional (3D) camera and a 3D display is generally performed in a 3D image generator and a formatter. A binocular stereocamera for photographing a 3D image has two image sensors. The 3D image generator synchronizes data entering through the two image sensors, and performs image alignment such as side-by-side. The formatter performs data alignment between pixels to be applied to a 3D display format. The 3D image generator performs a function similar to a 3D camera, and the formatter is a signal processing part related to a 3D display.

Here, it is important for the 3D image generator to synchronize the data input from the two image sensors. However, even when the two sensors are operated at the same time, it is difficult to exactly match starting points of the image data. In order to match the data starting points, a conventional art employs a method of storing data of two images in a frame buffer (a memory) and reading the two image data at the same time. However, the conventional method may cause increase in cost and power consumption due to use of the memory.

SUMMARY OF THE INVENTION

The present invention has been invented in order to overcome the above-described problems and it is, therefore, an object of the present invention to provide a technique capable of calculating a synchronization error of two image sensors with no frame memory, adjusting a pulse of a synchronization signal according to the calculated synchronization error, and synchronizing starting points of image data.

In accordance with one aspect of the present invention to achieve the object, there is provided an apparatus for synchronizing a stereocamera including: a synchronization error calculating unit configured to calculate a synchronization error from output signals of first and second image sensors; and a pulse adjusting unit configured to adjust a pulse of a synchronization signal of at least one of the first and second image sensors using the calculated error.

In one example of the present invention, the pulse adjusting unit may adjust the pulse of the synchronization signal of at least one of the first and second sensors when the calculated error exceeds a preset standard value.

Here, in one example, the pulse adjusting unit may recover the synchronization signal to the pulse before adjustment when the synchronization error recalculated by the synchronization error calculating unit is the preset standard value or less with respect to the outputs of the first and second image sensors according to the pulse adjustment of the synchronization signal.

In addition, in one example, the pulse adjusting unit may change a blank time of the synchronization signal of at least one of the first and second image sensors in an active section of the synchronization signal according to the calculated error, and recover the blank time to the blank time before change in the following active section.

In another example, the apparatus for synchronizing a stereocamera may further include a first-in first-out (FIFO) unit configured to perform synchronization of a fine error remained or occurred according to the signal adjusted by the pulse adjusting unit, with respect to the output signal of at least one of the first and second image sensors, and provide the synchronized signal to generate a three-dimensional (3D) image.

Here, in one example, the FIFO unit performs synchronization through input off or output off by a number of clocks corresponding to the fine error in the blank time with respect to the output signal of at least one of the first and second image sensors.

In accordance with another aspect of the present invention to achieve the object, there is provided a stereocamera including: first and second image sensors configured to detect and output images according to synchronization signals, respectively; a synchronization apparatus having a synchronization error calculating unit configured to calculate a synchronization error from output signals of first and second image sensors and a pulse adjusting unit configured to adjust a pulse of the synchronization signal of at least one of the first and second image sensors using the calculated error; and a 3D image generating unit configured to generate a 3D image from the output signals of the first and second image sensors.

In one example of the present invention, the pulse adjusting unit may adjust the pulse of the synchronization signal of at least one of the first and second sensors when the calculated error exceeds a preset standard value.

Here, in one example, the pulse adjusting unit may recover the synchronization signal to the pulse before adjustment when the synchronization error recalculated by the synchronization error calculating unit is the preset standard value or less with respect to the outputs of the first and second image sensors according to the pulse adjustment of the synchronization signal.

In addition, in one example, the pulse adjusting unit may change a blank time of the synchronization signal of at least one of the first and second image sensors in an active section of the synchronization signal according to the calculated error, and recover the blank time to the blank time before change in the following active section.

In one example of the present invention, the synchronization apparatus may further include a FIFO unit configured to perform synchronization of a fine error remained or occurred according to the signal adjusted by the pulse adjusting unit, with respect to the output signal of at least one of the first and second image sensors, and provide the synchronized signal to generate a 3D image.

In addition, in one example, the 3D image generating unit generates the 3D image from output signals of the first and second image sensors using one line memory.

Here, in one example, the 3D image generating unit may generate the 3D image through a side-by-side method.

In accordance with still another aspect of the present invention to achieve the object, there is provided a method of synchronizing a stereocamera including: calculating a synchronization error from output signals of first and second image sensors; and adjusting a pulse of a synchronization signal of at least one of the first and second image sensors using the calculated error.

In one example of the present invention, in the step of adjusting the pulse, when the calculated error exceeds a preset standard value, the pulse of the synchronization signal of at least one of the first and second image sensors may be adjusted.

Here, in one example, in the step of calculating the error, the synchronization error of the output of the first and second image sensors may be calculated by feedback of the adjusted synchronization signal, and in the step of adjusting the pulse, the synchronization signal may be recovered to the pulse before adjustment when the synchronization error calculated according to the feedback is the preset standard value or less.

In addition, in one example, in the step of adjusting the pulse, a blank time of the synchronization signal of at least one of the first and second image sensors may be changed in an active section of the synchronization signal according to the calculated error, and may be recovered to the blank time before change in the following active section.

In another example of the present invention, the method may further include performing synchronization of a fine error remained or occurred according to a signal adjusted in adjusting the pulse and providing the synchronized signal to generate a 3D image, with respect to the output signal of at least one of the first and second image sensors.

Here, in one example, in the step of performing the synchronization, the synchronization may be performed through input off or output off by a number of clocks corresponding to the fine error in the blank time with respect to the output signal of at least one of the first and second image sensors.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERABLE EMBODIMENTS

Figure 1:
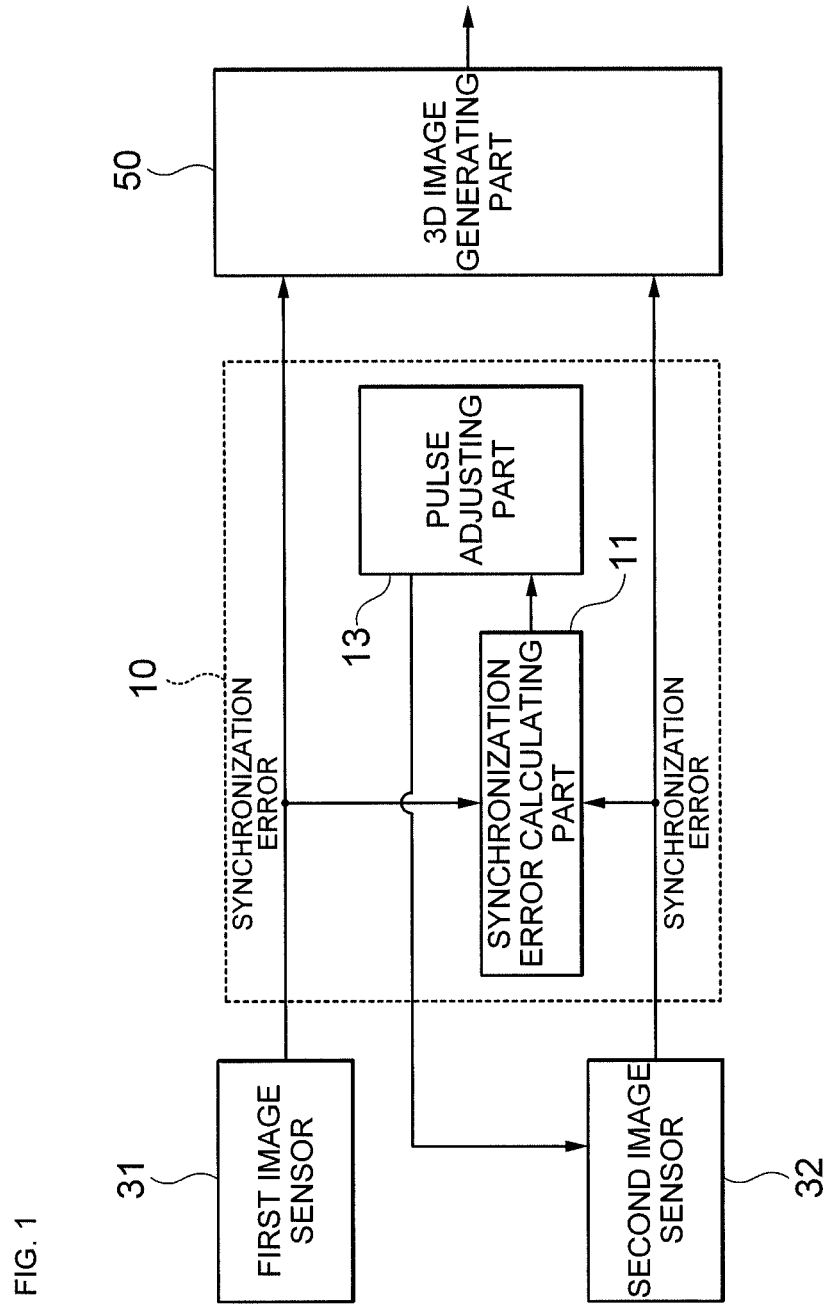
FIG. 1 is a block diagram schematically showing an apparatus for synchronizing a stereocamera in accordance with an exemplary embodiment of the present invention and a stereocamera including the same.

Exemplary embodiments of the present invention will be described in detail. However, the present invention is not limited to the embodiments disclosed below but can be implemented in various forms. The following embodiments are described in order to enable those of ordinary skill in the art to embody and practice the present invention. To clearly describe the present invention, parts not relating to the description are omitted from the drawings. Like numerals refer to like elements throughout the description of the drawings.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, components and/or groups, but do not preclude the presence or addition of one or more other features, components, and/or groups thereof.

Hereinafter, an apparatus for synchronizing a stereocamera in accordance with a first exemplary embodiment of the present invention will be described in detail with reference to the accompanying drawings. Reference numerals, which are not designated in a referenced drawing, may be designated by the same components of another drawing.

Figure 2:
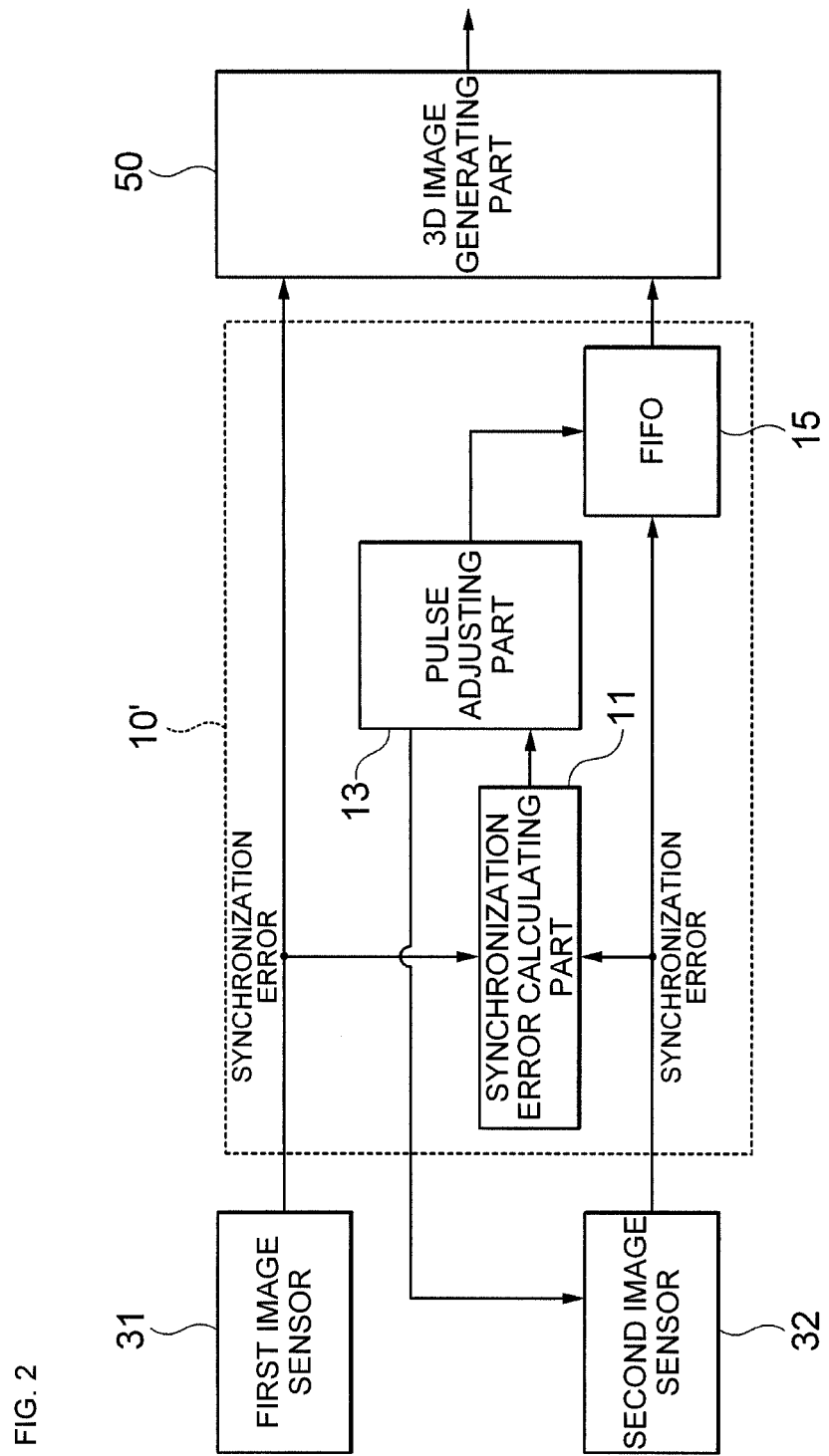
FIG. 2 is a block diagram schematically showing an apparatus for synchronizing a stereocamera in accordance with another exemplary embodiment of the present invention and a stereocamera including the same.
Figure 8:
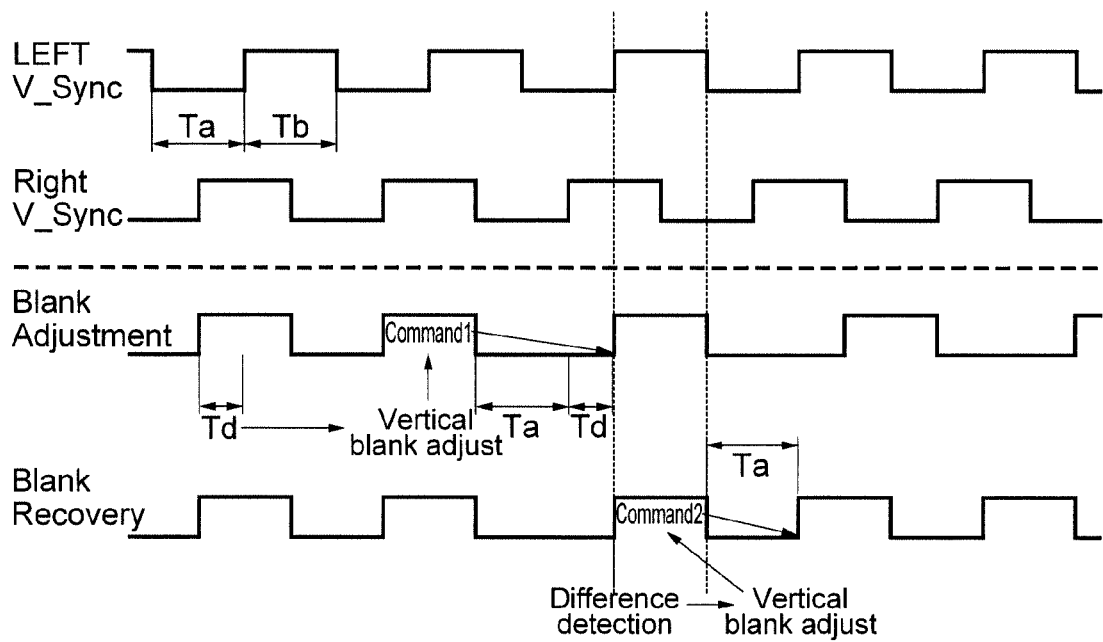
FIG. 8 shows pulse waves schematically showing a synchronizing method using an apparatus for synchronizing a stereocamera in accordance with another exemplary embodiment of the present invention.
Figure 9:
FIG. 9 is a view schematically showing a first-in first-out (FIFO) unit of the apparatus for synchronizing a stereocamera in accordance with an exemplary embodiment of the present invention.
Figure 10:
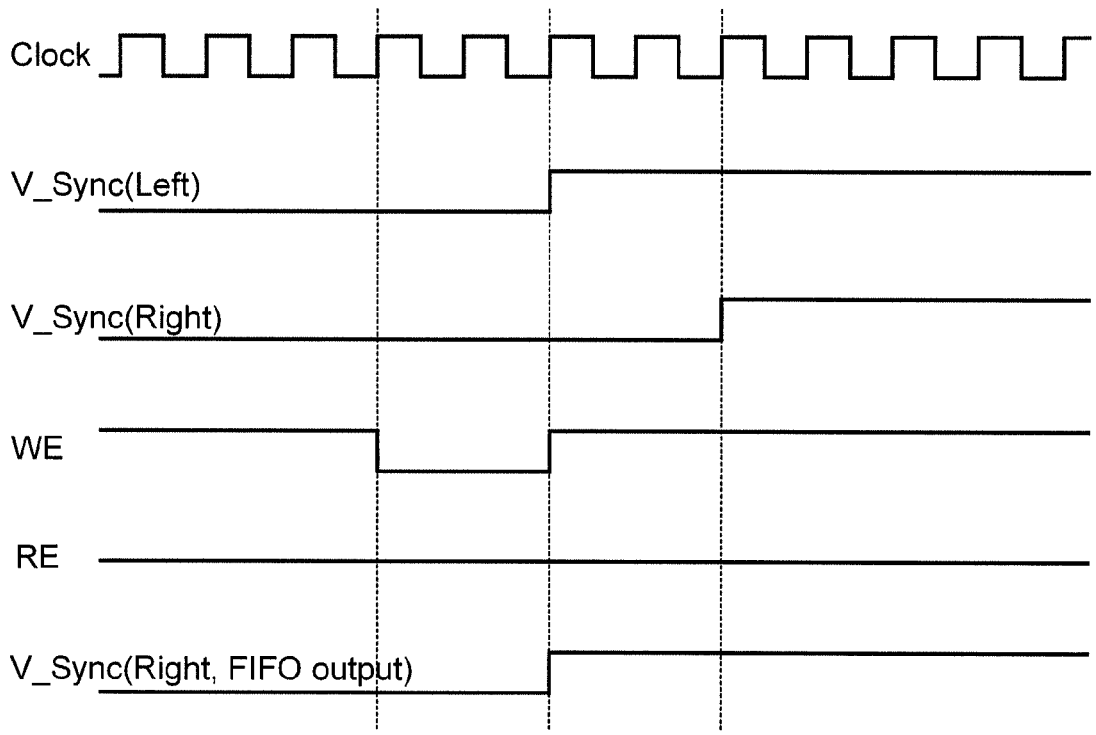
FIG. 10 shows pulse waves showing a synchronizing method in the FIFO unit of the apparatus for synchronizing a stereocamera in accordance with an exemplary embodiment of the present invention.
Figure 11:
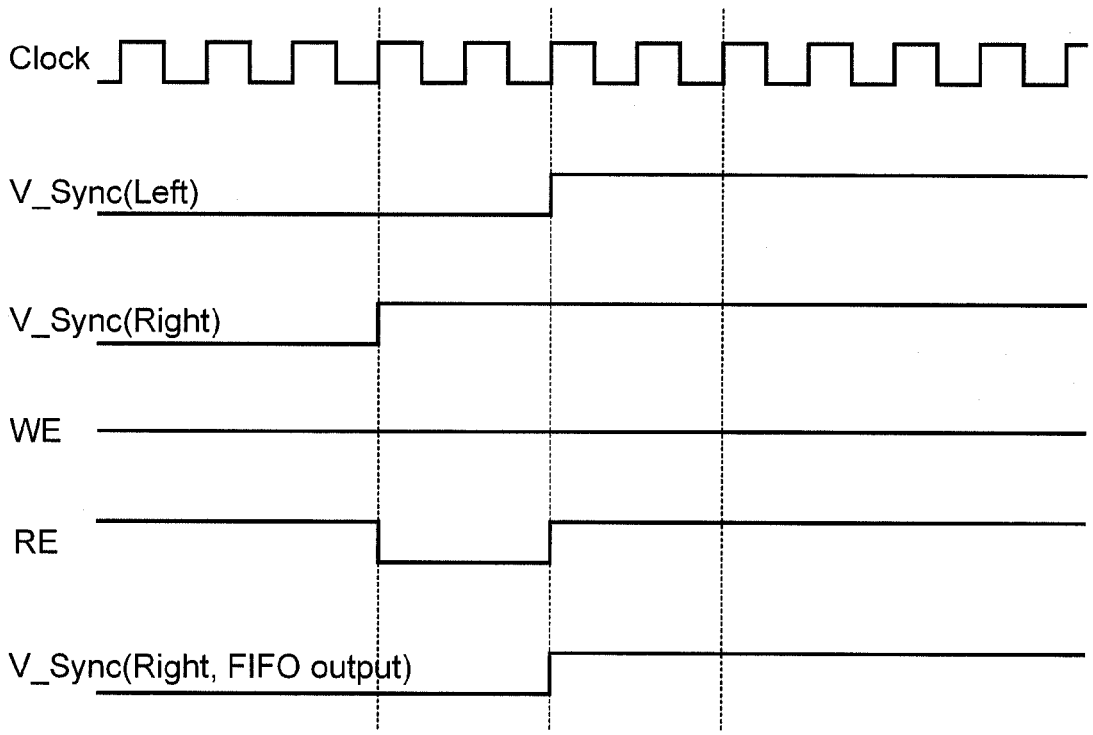
FIG. 11 shows pulse waves showing a synchronizing method in a FIFO unit of the apparatus for synchronizing a stereocamera in accordance with another exemplary embodiment of the present invention.

FIG. 1 is a block diagram schematically showing an apparatus for synchronizing a stereocamera in accordance with an exemplary embodiment of the present invention and a stereocamera including the same, FIG. 2 is a block diagram schematically showing an apparatus for synchronizing a stereocamera in accordance with another exemplary embodiment of the present invention and a stereocamera including the same, FIG. 8 shows pulse waves schematically showing a synchronizing method using an apparatus for synchronizing a stereocamera in accordance with another exemplary embodiment of the present invention, FIG. 9 is a view schematically showing a first-in first-out (FIFO) unit of the apparatus for synchronizing a stereocamera in accordance with an exemplary embodiment of the present invention, FIG. 10 shows pulse waves showing a synchronizing method in the FIFO unit of the apparatus for synchronizing a stereocamera in accordance with an exemplary embodiment of the present invention, and FIG. 11 shows pulse waves showing a synchronizing method in a FIFO unit of the apparatus for synchronizing a stereocamera in accordance with another exemplary embodiment of the present invention.

Referring to FIGS. 1 and 2, each apparatus for synchronizing a stereocamera 10 or 10' in accordance with a first exemplary embodiment of the present invention includes a synchronization error calculating unit 11 and a pulse adjusting unit 13.

In FIG. 1, the synchronization error calculating unit 11 calculates a synchronization error from first and second image sensors 31 and 32. The first and second image sensors 31 and 32 detect and output images according to synchronization signals, respectively. Since the signals output from the sensors have an error between the sensors, each output signal has the synchronization error. At this time, the output signals of the first and second image sensors 31 and 32 are detected to calculate the synchronization error. In one example, the synchronization error calculating unit 11 can calculate a timing error of a raising edge of the output signals of the first and second image sensors 31 and 32. Here, the timing error of the raising edge may be treated as the synchronization error. In addition, an error that can be calculated to show a timing error of a lowering edge or a difference of other synchronization signals, rather than the timing error of the raising edge of the output signal may be treated as the synchronization error.

Referring to FIG. 1, for example, the synchronization error is calculated by setting a signal of the first image sensor 31 as a standard signal and a signal of the second image sensor 32 as a reference signal.

In FIG. 1, the pulse adjusting unit 13 adjusts a pulse of a synchronization signal of at least one of the first and second image sensors 31 and 32 using the error calculated by the synchronization error calculating unit 11. Here, while the synchronization signals of both of the first and second image sensors 31 and 32 may be adjusted, the other synchronization signal may be adjusted with reference to any one synchronization signal. For example, in FIG. 1, a signal of the first image sensor 31 is set as a standard signal and a signal of the second image sensor 32 is set as a reference signal, a synchronization signal of the second image sensor 32, which is a reference signal, is adjusted according to the calculated error. That is, a pulse of the synchronization signal of the second image sensor 32, which is a reference signal, is adjusted to compensate the calculated error.

A conventional image sensor, for example, a complementary metal-oxide semiconductor (CMOS) image sensor includes a function of adjusting a vertical blank and a horizontal blank. Accordingly, when a blank setting value is varied in an active section, which is a section of outputting data, a length of the following blank section with no data may be immediately varied. A start timing of data may be adjusted using the above-mentioned.

Here, the pulse adjusting unit 13 can adjust a pulse by adjusting a blank time with respect to a vertical synchronization signal of at least one of the first and second image sensors 31 and 32. Here, the blank time means a pulse section in which image data are not processed by the image sensor. For example, referring to FIG. 1, the pulse can be adjusted by increasing or decreasing the blank time of the vertical synchronization signal of the second image sensor by the calculated error using the vertical synchronization signal of the first image sensor 31 as the standard signal.

According to the embodiment of the present invention, the synchronized image data of the first and second sensors 31 and 32 enables generation of a 3D image even when a frame memory is not provided.

In addition, in one example, the pulse adjusting unit 13 can adjust a pulse of the synchronization signal of at least of the first and second image sensors 31 and 32 when the calculated error exceeds a preset standard value. Here, the preset standard value may be appropriately determined by an operating frequency of the image sensor. Otherwise, for example, referring to FIG. 2, when the apparatus 10' for synchronizing a stereocamera further includes a FIFO unit 15, the preset standard value may be set according to a size of the FIFO unit.

Figure 5:
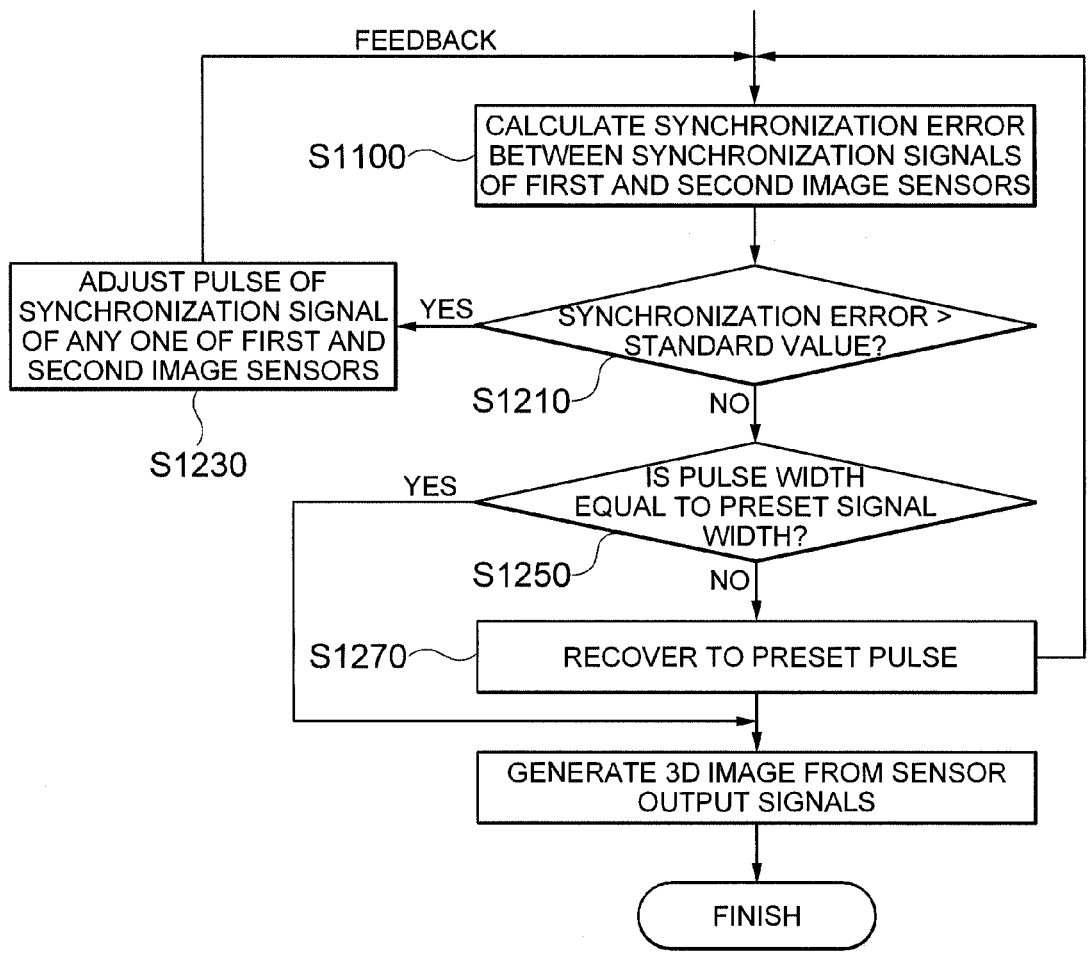
FIG. 5 is a flowchart schematically showing a method of synchronizing a stereocamera in accordance with still another exemplary embodiment of the present invention.

Here, referring to FIG. 8, in one example, the synchronization signal pulse adjusted by the pulse adjusting unit 13 is fed back to any one of the first and second image sensors 31 and 32, and if the synchronization error is recalculated by the synchronization error calculating unit 11, the pulse adjusting unit 13 can recover the synchronization signal to the pulse before adjustment when the synchronization error reproduced by the synchronization error calculating unit 11 is the preset standard value or less. Here, the pulse adjusting unit 13 can change a blank time in the active section, and recover a blank time in the active section in which the synchronization error is calculated, to the blank time before adjustment, when the recalculated synchronization error is the preset standard value or less. The active section means a pulse section in which image data are process by the image sensor, and the blank time means a pulse section in which image data are not processed by the image sensor. Here, whether the value is the synchronization error recalculated according to the feedback may be determined whether a pulse width when the synchronization error is not more than the standard value, for example, as shown in FIG. 5, is equal to a width of the synchronization signal. In addition, it is possible to determine whether the value is the synchronization error recalculated according to the feedback by comparing a currently output pulse width with the previous pulse width. Here, the pulse width may be, for example, a time of the blank section of the synchronization signal.

In FIG. 8, Ta represents a blank time of a vertical synchronization signal of an image sensor, and Tb represents an active time. A difference Td of the synchronization signal detected by the output signal of both of cameras is calculated by the synchronization error calculating unit 11 of FIG. 1, and a blank section of a reference signal in Command 1, for example, the output signal of the right image sensor, is widened at the pulse adjusting unit 13 by the calculated Td. After widening, when a synchronization signal difference is calculated again and a Td difference is a certain Th value (standard value) or less, the blank time returns to an original blank time Ta in Command 2.

In addition, in one example, the pulse adjusting unit 13 can change a blank time of the synchronization signal of at least one of the first and second image sensors 31 and 32 in an active section of the synchronization signal according to the calculated error, and recover the blank time before change in the following active section.

Reviewing another example of the present invention with reference to FIG. 2, the apparatus 10' for synchronizing a stereocamera may further include a FIFO unit 15. FIG. 9 shows the FIFO unit 15, which functions to firstly output a previously input signal. The input signal is a Data In signal, and the output signal is a Data Out signal. Here, as a portion of a section of a pulse is disabled using a write enable (WE) signal controlling an input or/and a read enable (RE) signal controlling an output, a timing of the input or/and output signal may be adjusted by a clock unit. In FIG. 2, when the blank time of the synchronization signal is adjusted by the pulse adjusting unit 13, since the synchronization error exactly calculated by the synchronization error calculating unit 11 cannot be finely adjusted by adjusting the blank only, the FIFO unit (15) may be provided so that fine adjustment can be performed by a clock unit.

The FIFO unit 15 may perform synchronization of a fine error remained or occurred according to the signal adjusted by the pulse adjusting unit 13 with respect to the output signal of at least one of the first and second image sensors 31 and 32. Here, the fine error may be an error remained or occurred by adjusting the pulse by adjusting the blank time in the pulse adjusting unit 13 according to the synchronization error calculated by the synchronization error calculating unit 11. The FIFO unit 15 may perform synchronization by adjusting a timing of the input or/and output signal by the fine error. The FIFO unit 15 may provide the synchronized signal to generate a 3D image. For example, in FIGS. 10 and 11, there is a 2-clock difference between the standard signal and the reference signal, which is a fine error remained or occurred by adjusting the blank time in the pulse adjusting unit 13 according to the synchronization error calculated by the synchronization error calculating unit 11. The pulse adjusting unit 13 can adjust the control signal RE or WE of the FIFO unit 15 to be adjusted by the 2-clock difference, which is a fine error remained or occurred by adjusting the blank time, in the FIFO unit 15.

According to the embodiment, as the FIFO unit 15 is further provided, the FIFO unit 15 can secondarily finely synchronize the signal by a clock unit and generate a 3D image without a separate frame memory for synchronization.

Here, referring to FIGS. 10 and 11, in one example, the FIFO unit 15 can perform synchronization of the output signal of at least one of the first and second image sensors 31 and 32 by a number of clocks corresponding to the fine error in the blank time through input off or output off. Here, a clock frequency is remarkably larger than a synchronization signal pulse frequency of the image sensor.

FIGS. 10 and 11 show that synchronization of the fine error is more exactly performed using the FIFO unit 15. For example, FIG. 10 shows a case in which a Right signal, which is a reference signal to be adjusted by the FIFO unit 15, is slower than a Left signal, which is a standard signal. In FIG. 10, the reference signal (Right signal) finely adjusted by the FIFO unit 15 is slower than the standard signal (Left signal) by two clocks. Accordingly, when the WE signal controlling the input of the FIFO unit 15 is low for two clocks in the blank section in which there is no data output of the image sensor with respect to the reference signal (Right signal), no data is stored in the FIFO unit 15. Accordingly, the data of the blank section is disregarded for the two clocks, and output of the FIFO unit 15 of the reference signal (Right signal) may be synchronized with the standard signal (Left signal) by a clock unit. Meanwhile, FIG. 11 shows a case in which the standard signal (Left signal) is slower than the reference signal (Right signal). Here, when the RE signal controlling the output of the FIFO unit 15 is low in the blank section of the reference signal (Right signal), since no data is read by the FIFO unit 15 for two clocks, the reference signal (Right signal) is delayed by two clocks so that the output of the FIFO unit 15 can be synchronized with the standard signal (Left signal) by a clock unit.

Hereinafter, a stereocamera in accordance with a second exemplary embodiment of the present invention will be described in detail with reference to the accompanying drawings. In description of the embodiments, the first embodiment may be referenced, and thus, overlapped description will be omitted. Reference numerals, which are not designated in a referenced drawing, may be designated by the same components of another drawing.

Figure 3:
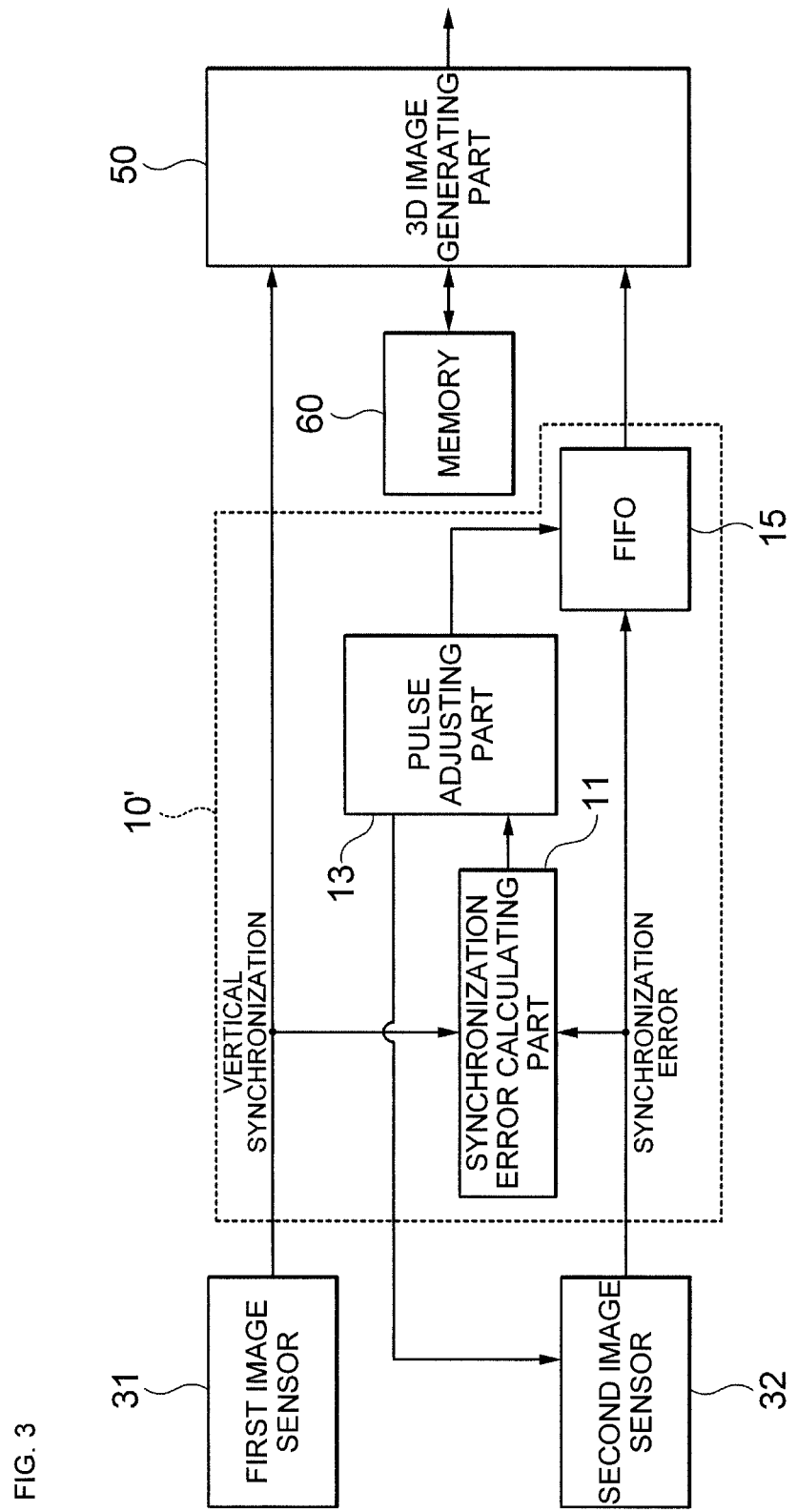
FIG. 3 is a block diagram schematically showing a stereocamera in accordance with a still another exemplary embodiment of the present invention.

FIG. 1 is a block diagram schematically showing an apparatus for synchronizing a stereocamera in accordance with an exemplary embodiment of the present invention and a stereocamera including the same, FIG. 2 is a block diagram schematically showing an apparatus for synchronizing a stereocamera in accordance with another exemplary embodiment of the present invention and a stereocamera including the same, and FIG. 3 is a block diagram schematically showing a stereocamera in accordance with a still another exemplary embodiment of the present invention.

Referring to FIGS. 1 and/or 2, the stereocamera in accordance with a second exemplary embodiment of the present invention may include first and second image sensors 31 and 32, synchronization apparatus 10 and 10', and a 3D image generating unit 50.

Here, the synchronization apparatus 10 and 10' may be the synchronization apparatus 10 and 10' of the stereocamera in accordance with any one of the first embodiment. The above embodiments will be referenced.

Referring to FIG. 2, in one example, the synchronization apparatus 10' may further include a FIFO unit 15. The FIFO unit 15 can perform synchronization of a fine error remained or occurred according to a signal adjusted by a pulse generating unit 13 with respect to an output signal of at least one of first and second image sensors 31 and 32. In addition, the FIFO unit 15 can provide the synchronized signal to generate a 3D image. Description of the FIFO unit 15 refers to the description of FIGS. 9 to 11.

In FIGS. 1 and/or 2, the first and second image sensors 31 and 32 detect and output an image according to synchronization signals, respectively. Since the signals output from the first and second image sensors 31 and 32 have an error due to a sensor device in processing of the sensors, the output signals have synchronization errors, respectively. Here, the synchronization signals of the sensors are detected, and the synchronization error is calculated from the detected synchronization signals by the synchronization error calculating unit 11 of the synchronization apparatus of the stereocamera.

A 3D image generating unit 50 generates a 3D image from the output signals of the first and second image sensors 31 and 32. For example, the 3D image generating unit 50 may generate a 3D image of the pulse-adjusted output signal of the synchronization signal by the pulse adjusting unit 13 when the value calculated by the synchronization error calculating unit 11 of the synchronization apparatus 10 and 10' of the stereocamera is within an allowable range. In addition, referring to FIG. 2, when the synchronization apparatus 10' of the stereocamera includes the FIFO unit 15, the FIFO unit 15 can generate a 3D image of the output signals synchronized by a clock unit.

According to the embodiment of the present invention, as the pulse adjusting unit 13 of the synchronization apparatus 10 and 10' of the stereocamera adjusts a pulse to perform synchronization, data of the images of the first and second image sensors 31 and 32 may generate a 3D image with no frame memory. More specifically, in one example, as the FIFO unit 15 is further provided and the FIFO unit 15 secondarily performs fine synchronization by a clock unit, a 3D image can be generated without a separate frame memory for synchronization.

In addition, referring to FIG. 3, in one example, the 3D image generating unit 50 can generate a 3D image from the output signals of the first and second image sensors 31 and 32 using one line memory 60. Here, the line memory 60 may be a buffer memory configured to generate a 3D image. The line memory 60 is referred to as a memory configured to store a certain line, for example, in a horizontal direction, from one image in image processing, unlike a frame memory configured to store all of one image. Accordingly, since the line memory 60 has a capacity smaller than that of a frame buffer memory, the line memory can be installed in one image processing IC. However, it is difficult to install the conventional frame memory in one image processing IC.

In this embodiment, it is possible to generate a 3D image by installing one line memory 60 only with no frame memory. Only one line memory 60 is provided to reduce cost, with no frame memory.

In one example, the 3D image generating unit 50 can generate a 3D image through a side-by-side method. The side-by-side method is referred to as a method of disposing two-directional images in one image at left and right sides. Here, the side-by-side method may be implemented using only one line memory 60. In addition to the line memory 60, as an additional component is further provided, the 3D image generating unit 50 may generate a 3D image through a top-down method in which two images are vertically disposed.

Hereinafter, a method of synchronizing a stereocamera in accordance with a third exemplary embodiment of the present invention will be described in detail with reference to the accompanying drawings. In description of the embodiments, in addition to FIGS. 4 to 8, 10 and 11, the first and second embodiments may be referenced, and thus, overlapped description will be omitted. Reference numerals, which are not designated in a referenced drawing, may be designated by the same components of another drawing.

Figure 4:
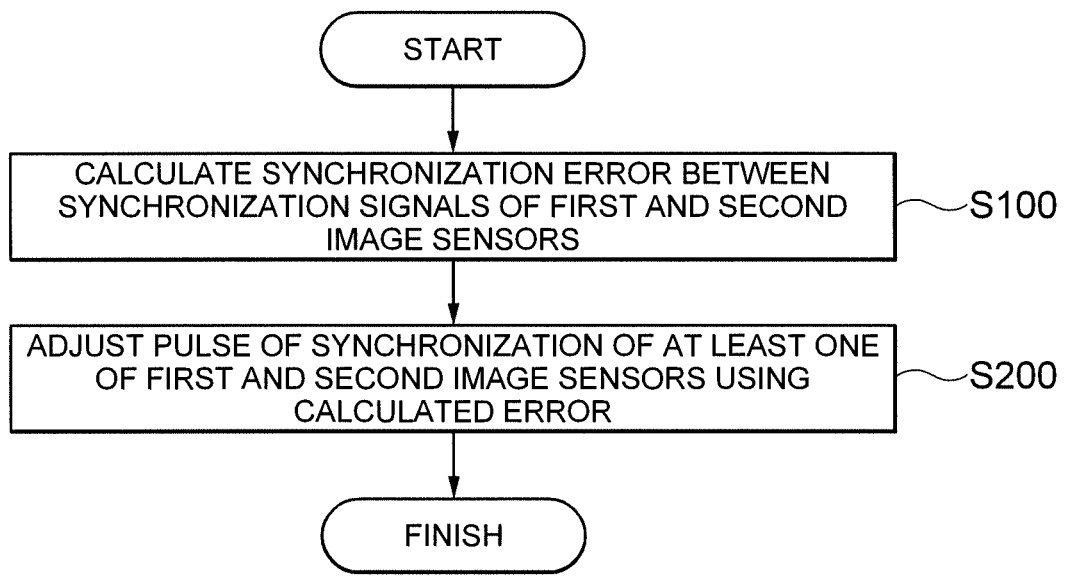
FIG. 4 is a flowchart schematically showing a method of synchronizing a stereocamera in accordance with another exemplary embodiment of the present invention.
Figure 6:
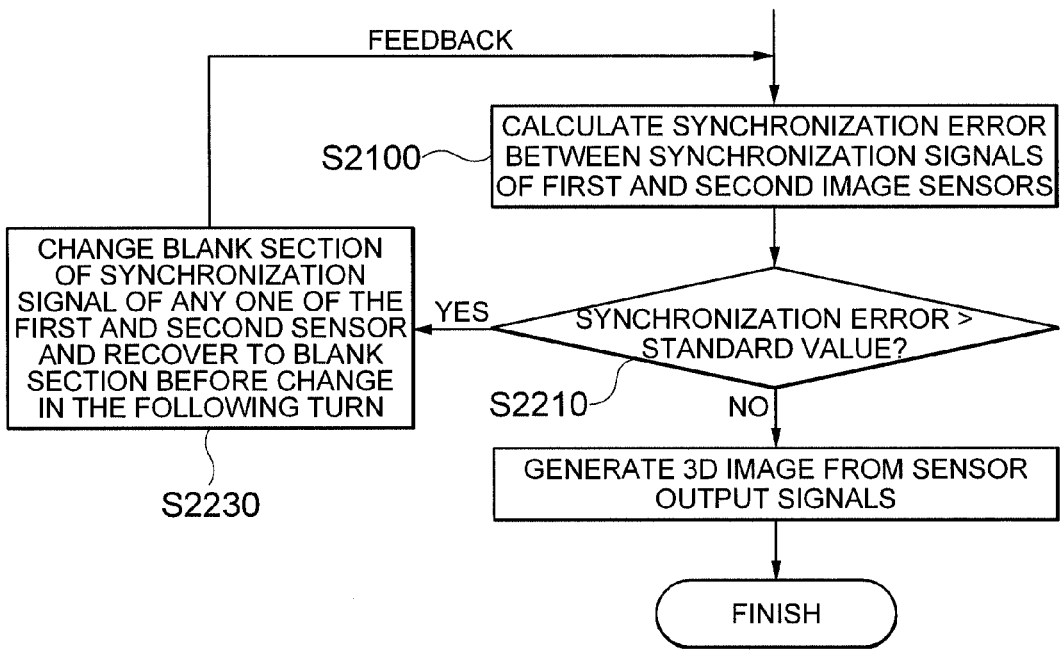
FIG. 6 is a flowchart schematically showing a method of synchronizing a stereocamera in accordance with still another exemplary embodiment of the present invention.
Figure 7:
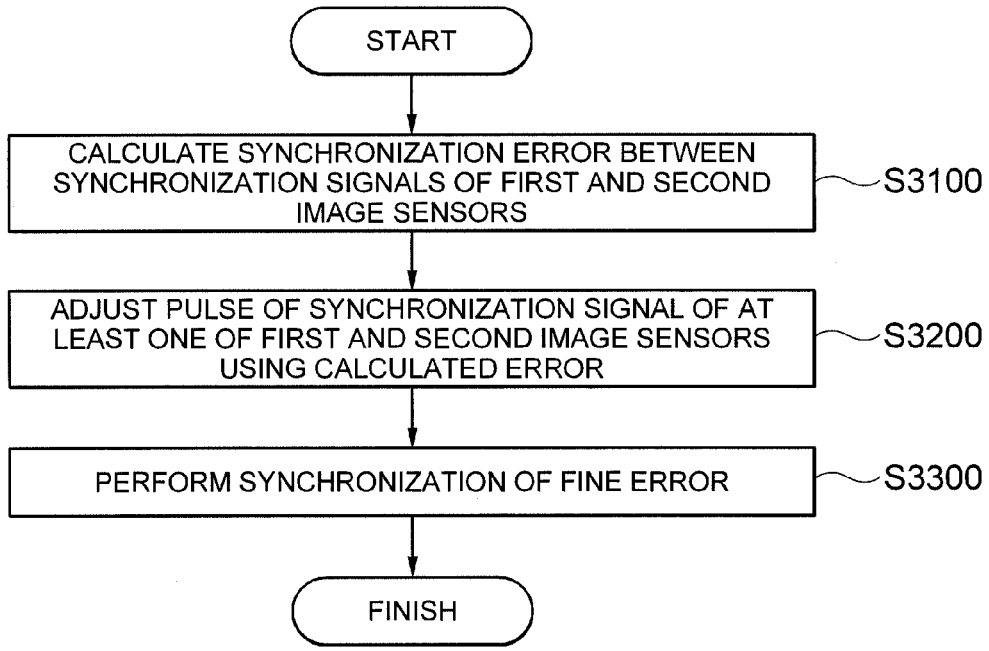
FIG. 7 is a flowchart schematically showing a method of synchronizing a stereocamera in accordance with still another exemplary embodiment of the present invention.

FIG. 4 is a flowchart schematically showing a method of synchronizing a stereocamera in accordance with another exemplary embodiment of the present invention, FIG. 5 is a flowchart schematically showing a method of synchronizing a stereocamera in accordance with still another exemplary embodiment of the present invention, FIG. 6 is a flowchart schematically showing a method of synchronizing a stereocamera in accordance with still another exemplary embodiment of the present invention, FIG. 7 is a flowchart schematically showing a method of synchronizing a stereocamera in accordance with still another exemplary embodiment of the present invention, FIG. 8 shows pulse waves schematically showing a synchronizing method using an apparatus for synchronizing a stereocamera in accordance with another exemplary embodiment of the present invention, FIG. 10 shows pulse waves showing a synchronizing method in the FIFO unit of the apparatus for synchronizing a stereocamera in accordance with an exemplary embodiment of the present invention, and FIG. 11 shows pulse waves showing a synchronizing method in a FIFO unit of the apparatus for synchronizing a stereocamera in accordance with another exemplary embodiment of the present invention.

Referring to FIG. 4, a method of synchronizing a stereocamera in accordance with a third exemplary embodiment of the present invention may include calculating a synchronization error (S100) and adjusting a pulse (S200).

Referring to FIG. 4, in calculating the synchronization error (S100), the synchronization error is calculated from output signals of first and second image sensors 31 and 32. Since the first and second image sensors 31 and 32 detect and output images according to the synchronization signals and the signals output from the sensors have errors due to the sensors, the output signals have the synchronization errors, respectively. Here, the output signals of the first and second image sensors 31 and 32 are detected to calculate the synchronization errors. In one example, a timing error of a raising edge of the output signals of the first and second image sensors 31 and 32 may be set as a synchronization error, or a timing error of a lowering edge or an error that can be calculated to show a difference of other synchronization signals, rather than the timing error of the raising edge of the output signal, may be set as a synchronization error.

Referring to FIG. 4, in adjusting the pulse (S200), the pulse of the synchronization signal of at least one of the first and second image sensors 31 and 32 is adjusted using the error calculated in calculating the synchronization error (S100). Here, while the synchronization signals of both of the first and second image sensors 31 and 32 may be adjusted, the other synchronization error may be adjusted with reference to the one synchronization signal. In one example, the pulse adjusting unit 13 can adjust a pulse by adjusting a blank time of a vertical synchronization signal of at least one of the first and second image sensors 31 and 32.

Referring to FIGS. 5 and/or 6, in one example of the present invention, when the error calculated in adjusting the pulse (S200) is larger than a preset standard value (S1210 and S2210), a pulse of the synchronization signal of at least one of the first and second image sensors 31 and 32 can be adjusted. Here, the preset standard value may be appropriately determined by an operating frequency of the image sensor. In addition, referring to FIG. 2, when the synchronization apparatus 10' of the stereocamera further includes the FIFO unit 15, the preset standard value may be determined according to a size of the FIFO.

More specifically, referring to FIG. 5, in one example, in calculating an error (S1100), the synchronization error of the output of the first and second image sensors 31 and 32 is calculated by feedback of the adjust synchronization signal, and in adjusting the pulse (S1210 to S1270), when the synchronization error calculated according to the feedback is lower than the preset standard value, the synchronization signal may be recovered to the pulse before adjustment (S1270). Here, whether the value is the synchronized error calculated according to the feedback is determined whether the pulse width is equal to a width of the preset synchronized signal when the synchronization error is not more than the standard value as shown in FIG. 5 (S1250). In addition, whether the value is the synchronization error calculated by the feedback may be determined by comparing a currently output pulse width with the previous pulse width. Here, the pulse width may be, for example, a time of the blank time of the synchronization signal.

In addition, specifically reviewing the method with reference to FIG. 6, in one example, in adjusting the pulse (S2210 to S2230), the blank time of the synchronization signal of at least one of the first and second image sensors 31 and 31 may be varied in an active section of the synchronization signal according to the calculated error, and may be returned to the blank time before the change in the following active section (S2230).

Another example of a method of synchronizing a stereocamera will be described with reference to FIG. 7.

Referring to FIG. 7, a method of synchronizing a stereocamera according to an example may further include performing synchronization of a fine error (S3300). In performing the synchronization of the fine error (S3300), the synchronization of the fine error remained or occurred according to the signal adjusted in adjusting the pulse (S3200) is performed with respect to the output signal of at least one of the first and second image sensors 31 and 32. When the blank time of the synchronization signal is adjusted in adjusting the pulse (S3200), since fine adjustment of the exact synchronization error calculated in calculating the synchronization error (S1100) cannot be easily performed by adjusting the blank only, the FIFO unit 15 of the synchronization apparatus of the stereocamera shown in FIG. 2 is provided so that fine adjustment can be performed by a clock unit in performing the synchronization of the fine error (S3300). Here, the fine error may be an error remained or occurred by adjusting the pulse by adjusting the blank time in adjusting the pulse (S3200) according to the synchronization error calculated in calculating the synchronization error (S1100). For example, in FIGS. 10 and 11, there is a 2-clock difference between the standard signal and the reference signal. The difference is a fine error remained or occurred by adjusting the blank time in adjusting the pulse (S3200) according to the synchronization error calculated in calculating the synchronization error (S1100). In addition, RE or WE, which are control signals of the FIFO unit 15 of FIG. 2 may be adjusted to be adjusted by the FIFO unit 15 by the two clocks, which is the fine error remained or occurred according to adjustment of the blank time. Further, in performing the synchronization of the fine error (S3300), the synchronized signal may be provided to generate a 3D image.

Furthermore, referring to FIGS. 10 and/or 11, in one example, in performing the synchronization (S3300), the synchronization may be performed through input off or output off by a number of clocks corresponding to the fine error in the blank time with respect to the output signal of at least one of the first and second image sensors 31 and 32.

As can be seen from the foregoing, according to an aspect of the present invention, the starting point of the image data can be synchronized by calculating the synchronization error of the two image sensors and adjusting the pulse of the synchronization signal according to the calculated synchronization error. Accordingly, data synchronization of the stereocamera becomes possible without a frame memory (a buffer memory) having a large capacity.

As described above, although the preferable embodiments of the present invention have been shown and described, it will be appreciated by those skilled in the art that substitutions, modifications and variations may be made in these embodiments without departing from the principles and spirit of the general inventive concept, the scope of which is defined in the appended claims and their equivalents.

What is claimed is:

1. An apparatus for synchronizing a stereocamera, comprising:
a synchronization error calculator configured to calculate a synchronization error from output signals of first and second image sensors;
a pulse adjuster configured to adjust a pulse of a synchronization signal of at least one of the first and second image sensors using the calculated error;
a first-in first-out (FIFO) synchronizer configured to perform synchronization of a fine error remaining or occurring in a blank time according to the signal adjusted by the pulse adjuster, with respect to the output signal of at least one of the first and second image sensors, and to provide the synchronized signal to generate a three-dimensional (3D) image,
wherein the FIFO synchronizer performs synchronization through input off or output off by a number of clocks corresponding to the fine error in the blank time with respect to the output signal of at least one of the first and second image sensors.

2. The apparatus for synchronizing a stereocamera of claim 1, wherein the pulse adjuster adjusts the pulse of the synchronization signal of at least one of the first and second sensors in response to the calculated error exceeding a preset standard value.

3. The apparatus for synchronizing a stereocamera of claim 2, wherein the pulse adjuster recovers the synchronization signal to the pulse before adjustment in response to the synchronization error recalculated by the synchronization error calculator being the preset standard value or less with respect to the outputs of the first and second image sensors according to the pulse adjustment of the synchronization signal.

4. The apparatus for synchronizing a stereocamera of claim 2, wherein the pulse adjuster changes a blank time of the synchronization signal of at least one of the first and second image sensors in an active section of the synchronization signal according to the calculated error, and recovers the blank time to the blank time before a change in the following active section.

5. A method of synchronizing a stereocamera, comprising:
calculating a synchronization error from output signals of first and second image sensors;
adjusting a pulse of a synchronization signal of at least one of the first and second image sensors using the calculated error; and
performing synchronization of a fine error remaining or occurring in a blank time according to the signal adjusted in adjusting the pulse and providing the synchronized signal to generate a 3D image, with respect to the output signal of at least one of the first and second image sensors,
wherein, in the step of performing the synchronization, the synchronization is performed through input off or output off by a number of clocks corresponding to the fine error in the blank time with respect to the output signal of at least one of the first and second image sensors.

6. The method of synchronizing a stereocamera of claim 5, wherein, in the step of adjusting the pulse, in response to the calculated error exceeding a preset standard value, the pulse of the synchronization signal of at least one of the first and second image sensors is adjusted.

7. The method of synchronizing a stereocamera of claim 6, wherein, in the step of calculating the error, the synchronization error of the output of the first and second image sensors is calculated by feedback of the adjusted synchronization signal, and
in the step of adjusting the pulse, the synchronization signal is recovered to the pulse before adjustment in response to the synchronization error calculated according to the feedback being the preset standard value or less.

8. The method of synchronizing a stereocamera of claim 6, wherein, in the step of adjusting the pulse, a blank time of the synchronization signal of at least one of the first and second image sensors is changed in an active section of the synchronization signal according to the calculated error, and is recovered to the blank time before a change in the following active section.

* * * * *